United States Patent
Shimazaki

(10) Patent No.: US 9,746,084 B2
(45) Date of Patent: Aug. 29, 2017

(54) MAGNETIC FLUID SEALING APPARATUS

(71) Applicant: RIGAKU CORPORATION, Akishima-shi, Tokyo (JP)

(72) Inventor: Yasuyuki Shimazaki, Akishima (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 15/104,014

(22) PCT Filed: Sep. 12, 2014

(86) PCT No.: PCT/JP2014/074172
§ 371 (c)(1),
(2) Date: Jun. 13, 2016

(87) PCT Pub. No.: WO2015/098202
PCT Pub. Date: Jul. 2, 2015

(65) Prior Publication Data
US 2016/0312899 A1    Oct. 27, 2016

(30) Foreign Application Priority Data
Dec. 24, 2013   (JP) .............................. 2013-265312

(51) Int. Cl.
*F16J 15/40*     (2006.01)
*F16J 15/43*     (2006.01)
(Continued)

(52) U.S. Cl.
CPC ............. *F16J 15/43* (2013.01); *F16C 33/765* (2013.01); *F16J 15/16* (2013.01); *F16J 15/164* (2013.01); *F16J 15/3212* (2013.01); *F16C 19/54* (2013.01)

(58) Field of Classification Search
CPC .. F16J 15/40; F16J 15/43; F16C 33/72; F16C 33/76; F16C 33/762; F16C 33/765
See application file for complete search history.

(56) References Cited

U.S. PATENT DOCUMENTS 4,605,233 A * 8/1986 Sato .................... F16J 15/43
                                                   277/410
4,995,622 A * 2/1991 Fuse .................... F16J 15/43
                                                   277/410
(Continued)

FOREIGN PATENT DOCUMENTS

| JP | 58-98697 A | 6/1983 |
| JP | 4-321881 A | 11/1992 |
| JP | 11-166633 A | 6/1999 |

OTHER PUBLICATIONS

International Search Report dated Oct. 7, 2014, issued in counterpart International Application No. PCT/JP2014/074172 (1 page).

*Primary Examiner* — Gilbert Lee
(74) *Attorney, Agent, or Firm* — Westerman, Hattori, Daniels & Adrian, LLP

(57) ABSTRACT

An even number of magnets (5) are incorporated in a housing (3) while sandwiched by pole pieces (6). A rotating shaft (2) has a boundary which is provided in a hollow portion (3*a*) of the housing (3) and nearer to an airtight chamber (1) than a pole piece (6) nearest to the airtight chamber (1), and an area of the rotating shaft (2) which is nearer to the airtight chamber (1) than the boundary is formed of a non-magnetic material. In the housing (3), an area located near the airtight chamber (1) from a site which is in contact with a pole piece (6) nearest to the airtight chamber (1) is formed of a magnetic material.

7 Claims, 8 Drawing Sheets

(51) Int. Cl.
  *F16J 15/16*    (2006.01)
  *F16J 15/3212*  (2016.01)
  *F16C 33/76*    (2006.01)
  *F16C 19/54*    (2006.01)

(56) References Cited

U.S. PATENT DOCUMENTS

| | | |
|---|---|---|
| 6,247,701 B1 | 6/2001 | Kitada et al. |
| 2010/0025935 A1* | 2/2010 | Helgeland ................ F16J 15/43 |
| | | 277/410 |
| 2011/0198814 A1* | 8/2011 | Oshita ...................... F16J 15/43 |
| | | 277/501 |
| 2011/0210520 A1* | 9/2011 | Li ............................ F16J 15/43 |
| | | 277/501 |
| 2012/0018958 A1* | 1/2012 | Kung .................... F04D 29/102 |
| | | 277/410 |
| 2012/0049871 A1* | 3/2012 | Raj ......................... F16J 15/43 |
| | | 324/722 |

* cited by examiner

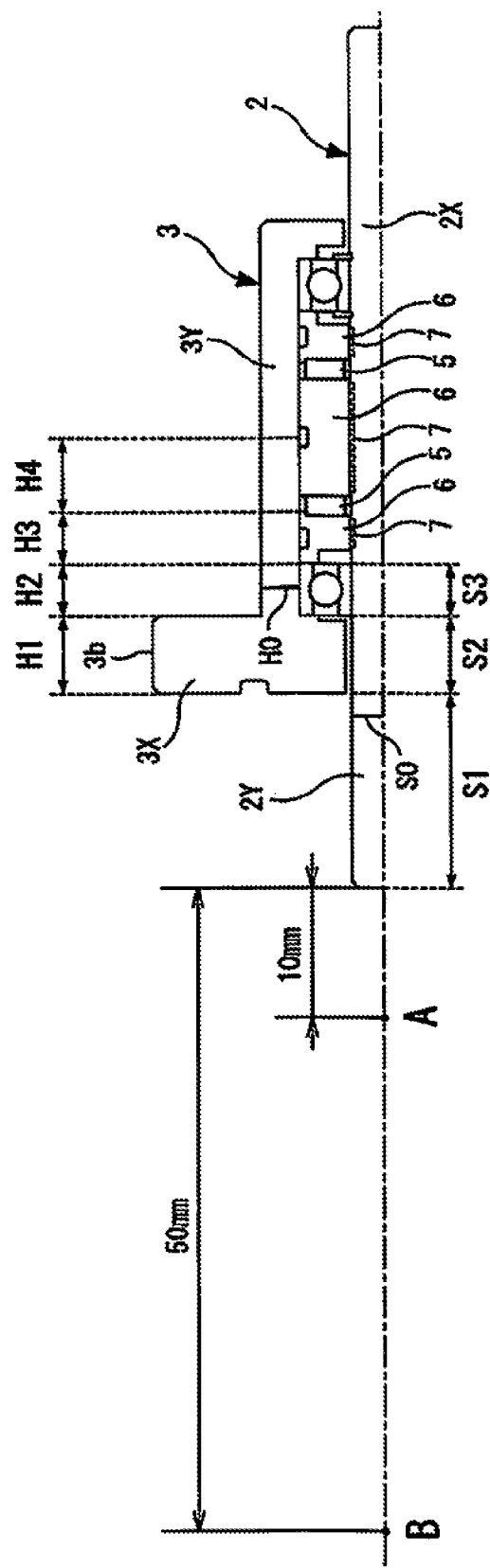

Fig. 4

| No | HOUSING AREA OF MAGNETIC MATERIAL | ROTATING SHAFT AREA OF NON-MAGNETIC MATERIAL | POINT A ($\mu$T) | POINT B ($\mu$T) |
|---|---|---|---|---|
| 1 | (ALL AREAS FORMED OF NON-MAGNETIC MATERIAL) | (ALL AREAS FORMED OF MAGNETIC MATERIAL) | 446.5 | 26.2 |
| 2 | (ALL AREAS FORMED OF NON-MAGNETIC MATERIAL) | S1 | 268.2 | 19.4 |
| 3 | (ALL AREAS FORMED OF NON-MAGNETIC MATERIAL) | S1+S2 | 228.4 | 16.2 |
| 4 | (ALL AREAS FORMED OF NON-MAGNETIC MATERIAL) | S1+S2+S3 | 237.3 | 17.4 |
| 5 | H1 | S1+S2 | 279.7 | 31.0 |
| 6 | H1+H2 | S1+S2 | 268.5 | 30.9 |
| 7 | H1+H2+H3 | S1+S2 | 160.9 | 16.2 |
| 8 | H1+H2+H3+H4 | S1+S2 | 335.3 | 63.0 |
| 9 | H1+H2+H3 | (ALL AREAS FORMED OF MAGNETIC MATERIAL) | 206.3 | 17.7 |
| 10 | H1+H2+H3 | S1 | 162.1 | 16.3 |
| 11 | H1+H2+H3 | S1+S2+S3 | 169.7 | 17.7 |

※ all areas other than the above areas of the housing were formed of non-magnetic material ※ all areas other than the above areas of the rotating shaft were formed of magnetic material

Fig. 6

| No | HOUSING AREA OF MAGNETIC MATERIAL | ROTATING SHAFT AREA OF NON-MAGNETIC MATERIAL | POINT A ($\mu$T) | POINT B ($\mu$T) |
|---|---|---|---|---|
| 1 | (ALL AREAS FORMED OF NON-MAGNETIC MATERIAL) | (ALL AREAS FORMED OF MAGNETIC MATERIAL) | 1538.5 | 165.4 |
| 2 | (ALL AREAS FORMED OF NON-MAGNETIC MATERIAL) | S1 | 1021.4 | 145.4 |
| 3 | (ALL AREAS FORMED OF NON-MAGNETIC MATERIAL) | S1+S2 | 933.4 | 139.0 |
| 4 | (ALL AREAS FORMED OF NON-MAGNETIC MATERIAL) | S1+S2+S3 | 928.9 | 139.0 |
| 5 | H1+H2+H3 | S1+S2 | 1097.7 | 178.4 |

※ all areas other than the above areas of the housing were formed of non-magnetic material ※ all areas other than the above areas of the rotating shaft were formed of magnetic material

MAGNETIC FLUID SEALING APPARATUS

TECHNICAL FIELD

The present invention relates to a magnetic fluid sealing apparatus for supporting a rotating shaft whose partial area is inserted in an airtight chamber while airtightness in the airtight chamber is kept.

BACKGROUND ART

In the industrial world, various kinds of apparatuses have existed which are configured so that the inside of a space airtightly-shielded from the outside is kept to a pressure state different from the outside pressure, that is, kept under a differential pressure state and various kinds of treatments are allowed to be performed under the differential pressure state. In some cases, various kinds of treatments are performed while the inside of the space is kept to a dust-proof state or a special gas environmental state in addition to the differential pressure state. For example, predetermined treatments are performed under a vacuum-evacuated dust-proof state in an evacuating processing apparatus for semiconductor wafers, a vacuum dryer, a rotating anticathode type X-ray generator, an electron microscope or the like. A magnetic fluid sealing apparatus is used to shield two areas of a space area (the inside of an airtight chamber) for performing these predetermined treatments and an atmosphere pressure area from each other.

A conventional magnetic fluid sealing apparatus is configured so that bearings are incorporated in the inner walls the neighborhood of both the ends of a cylindrical housing, and the rotating shaft is freely rotatably supported by these bearings. Furthermore, the conventional magnetic fluid sealing apparatus is configured so that a magnet is contained in the housing and magnetic fluid is filled in the gap between the magnet and the rotating shaft to enhance hermetical sealing. The magnetic fluid is held in the gap between the magnet and the rotating shaft by magnetic field occurring around the magnet.

Patent Document 1 discloses a conventional magnetic fluid sealing apparatus having a structure of this type.

Since the magnetic fluid sealing apparatus contains the magnet as described above, magnetic field unavoidably occurs around the magnet. However, a target apparatus to which the magnetic fluid sealing apparatus is applied has a risk that the performance of the target apparatus is adversely affected by the magnetic field. For example, this occurs in such a case that an electron microscope using an electron beam, an X-ray generator for making electrons from an electron gun impinge against an anticathode (target) to generate X-ray from the surface of the anticathode or the like is used as the target apparatus. In these apparatuses, electrons are treated in an airtight chamber, and thus when magnetic field generated by the magnet of the magnetic fluid sealing apparatus leaks into the airtight chamber of the target apparatus, there is a concern about such an adverse effect that the trajectory of electrons is deviated from an original trajectory by the leaking magnetic field or the like.

PRIOR ART DOCUMENT

Patent Document

Patent Document: JP-A-H11-166633

DISCLOSURE OF THE INVENTION

Problem to be Solved by the Invention

The present invention has been implemented in view of the foregoing situation, and has an object to provide a magnetic fluid sealing apparatus that suppresses leakage of magnetic field to an airtight chamber side.

Means of Solving the Problem

According to the present invention, a magnetic fluid sealing apparatus for supporting a rotating shaft having a partial area inserted in an airtight chamber while keeping airtightness in the airtight chamber comprises:

a housing that is provided at a boundary portion through which the airtight chamber and an outside space thereof are partitioned, and has a hollow portion through which the rotating shaft is inserted;

a plurality of magnets that are incorporated in the housing to be arranged at any interval in an axial direction;

a plurality of pole pieces (magnetic pole pieces) that are incorporated in the housing so as to sandwich the plurality of magnets and arranged so that inner end faces thereof in a radial direction confront a peripheral surface of the rotating shaft; and magnetic fluid filled between the inner end faces in the radial direction of the pole pieces and the periphery surface of the rotating shaft.

Here, as the plurality of magnets, an even number of magnets are incorporated in the housing while the end faces confronting each other in the axial direction are set to the same pole.

Furthermore, the pole pieces are formed of magnetic material.

The rotating shaft has a boundary which is located in a hollow portion of the housing and nearer to the airtight chamber than a pole piece nearest to the airtight chamber, an area of the rotating shaft that is nearer to an outside space than the boundary being formed of a magnetic material while an area of the rotating shaft that is nearer to the airtight chamber than the boundary is formed of a non-magnetic material.

The housing is provided with a boundary that is provided in a region ranging from an area which is in contact with the pole piece nearest to the airtight chamber to an area which is nearer to the outside space than the former area and is not in contact with a pole piece adjacent to the nearest pole piece, an area of the housing that is nearer to the airtight chamber than the boundary being formed of the magnetic material while an area of the housing that is nearer to the outside space than the boundary is formed of the non-magnetic material.

The inventor has experimentally found that the above configuration can suppress spreading of magnetic field occurring around a magnet, particularly spreading of magnetic field in the direction to the airtight chamber.

In order to suppress growth in size caused by dimensional increase of the housing in the axial direction, the apparatus is preferably configured so that two or four magnets are incorporated in the housing.

BRIEF DESCRIPTION OF THE DRAWINGS

FIG. 3 is a half cross-sectional view showing an experimental example 1 of the magnetic fluid sealing apparatus according to the present invention.

FIG. 4 is a table showing a measurement result of the experimental example 1.

FIG. 6 is a table showing a measurement result of the comparative example 1.

DESCRIPTION OF REFERENCE NUMERALS

Figure 1:
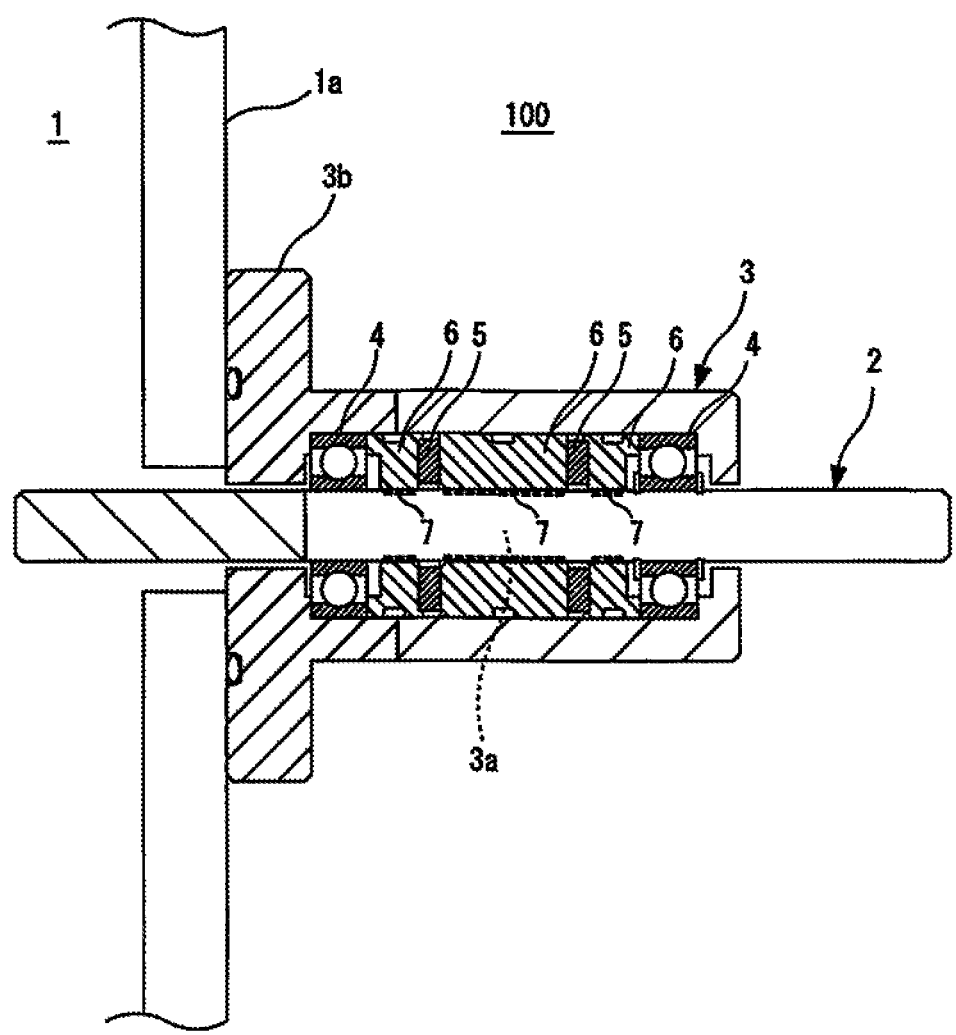
FIG. 1 is a front cross-sectional view showing the basic construction of a magnetic fluid sealing apparatus according to an embodiment of the present invention.

1: airtight chamber, 1a: wall surface of airtight chamber, 2: rotating shaft, 2X: area of magnetic material, 2Y: area of non-magnetic material, 3: housing, 3X: area of magnetic material, 3Y: area of non-magnetic material, 3a: hollow portion, 3b: flange portion, 4: bearing, 5: magnet, 6: pole piece (magnetic pole piece), 7: magnetic fluid, 100: outside space Best Modes for Carrying Out the Invention An embodiment according to the present invention will be described in detail with reference to the drawings.
[Basic Construction]
First, the basic construction of a magnetic fluid sealing apparatus according to an embodiment of the present invention will be described with reference to FIG. 1.

The magnetic fluid sealing apparatus according to this embodiment is mounted on a wall surface 1a of an airtight chamber of a target apparatus to which the magnetic fluid sealing apparatus is applied, and supports a rotating shaft 2 whose partial area is inserted in the airtight chamber 1 so that the rotating shaft 2 is freely rotatable. The magnetic fluid sealing apparatus has a function of keeping the airtightness of the inside of the airtight chamber 1, and has a housing 3, bearings 4, magnets 5, pole pieces 6 (magnetic pole pieces) and magnetic fluid 7 as main constituent components.

The housing 3 is a component constituting the housing of the magnetic fluid sealing apparatus, and has a hollow portion 3a which is formed in the housing 3 so as to penetrate from one end to the other end of the housing 3 and have a circular cross-section. The rotating shaft 2 is inserted to penetrate through the hollow portion 3a, and a part thereof is inserted in the airtight chamber 1. Furthermore, a flange portion 3b is formed on the outer surface of the one end portion of the housing 3. The flange portion 3b is fixed to the wall surface 1a of the airtight chamber 1 by using a fastening tool such as a bolt or the like (not shown), whereby the magnetic fluid sealing apparatus is disposed at the boundary portion through which the airtight chamber 1 and the outside space 100 thereof are partitioned.

The bearings 4 are incorporated in the vicinity of both the ends of the housing 3 while the support surfaces thereof are exposed to the peripheral surface of the hollow portion 3a. The rotating shaft 2 inserted in the hollow portion 3a is freely rotatably supported by the bearings 4.

An even number of magnets 5 are incorporated in the housing 3 so as to be arranged and spaced from one another in an axial direction at any interval. Here, the even number of magnets 5 are incorporated and arranged so that the confronting end faces of the respective magnets 5 in the axial direction have the same polarity. For example, when two magnets 5 are incorporated, the magnets 5 are arranged so that both the confronting end faces of the respective magnets 5 are set to S pole or N pole. Likewise, in a case where four magnets 5 are incorporated, if the magnets are arranged so that the confronting end faces of the first and second magnets 5 from the left are set to the S pole (or N pole), the confronting end faces of the second and third magnets 5 would be set to the N pole (or S pole), and the confronting end faces of the third and fourth magnets 5 would be set to the S pole (or N pole).

Furthermore, plural pole pieces 6 (magnetic pole pieces) are incorporated in the housing 3 so as to sandwich the plural magnets 5 therebetween. These pole pieces 6 are formed of magnetic material, and arranged so that the inner end faces thereof in the radial direction confront the peripheral surface of the rotating shaft 2.

The magnetic fluid 7 is filled between the inner end face of each pole piece 6 and the peripheral surface of the rotating shaft 2 which confront each other. The magnetic fluid 7 is a fluid formed by dispersing metal fine particles of magnetic material in a non-magnetic fluid medium in the form of colloidal. For example, fluid formed by dispersing ferrite or other magnetic powder in fluid of carbon hydride, fluorocarbon, aliphatic acid or the like may be used.

The filled magnetic fluid 7 concentrates on a magnetic flux constituting a magnetically closed circuit which emits from each magnet 5 and passes through each pole piece 6 and the magnetic material portion of the rotating shaft 2, thereby constituting a magnetic fluid membrane. The airtight chamber 1 and the outside space 100 are insulated from each other by the thus-formed magnetic fluid membrane, whereby the airtight state in the airtight chamber 1 is kept.

It is preferable that plural grooves extending in the peripheral direction are formed on any one or both of the inner end face of the pole piece 6 and the peripheral surface of the rotating shaft 2 which confront each other and the magnetic fluid 7 is filled in these grooves as shown in FIG. 1 because the magnetic fluid 7 can be more firmly trapped at this place.

In the thus-constructed magnetic fluid sealing apparatus, the rotating shaft 2 and the housing 3 are constructed by the combination of the magnetic material and the non-magnetic material. Here, the magnetic material is defined as a material characterized in that the material is magnetized by the magnet 5, and the non-magnetic material is a material characterized in that the material is not magnetized even when the magnet 5 is approached to the material.

Figure 2:
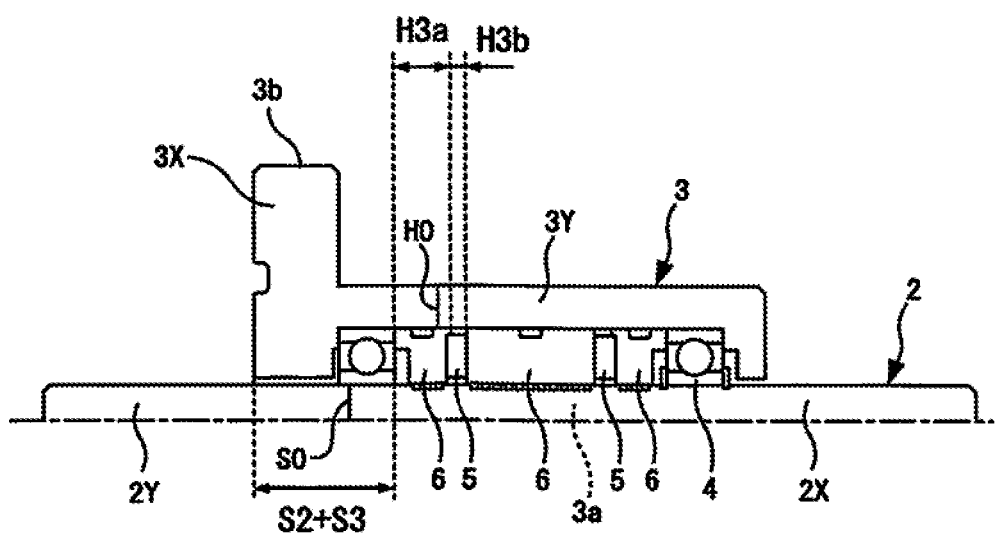
FIG. 2 is a half cross-sectional view showing a characteristic structure of the magnetic fluid sealing apparatus according to the embodiment of the present invention, and a hatching representing the cross-section is omitted (the same applies in FIGS. 3, 5, 7, 8).

Specifically, as shown in FIG. 2, the rotating shaft 2 is configured so that a boundary SO between a non-magnetic material and a magnetic material is set in the hollow portion 3a of the housing 3 and within an area S2+S3 nearer to the airtight chamber 1 than the pole piece 6 nearest to the airtight chamber 1, an area 2X nearer to the outside space 100 than the boundary SO is formed of the magnetic material, and an area 2Y nearer to the airtight chamber 1 than the boundary SO is formed of the non-magnetic material.

Furthermore, the housing 3 is configured so that a boundary HO is set at any site in a region ranging from an area H3a which is in contact with the pole piece 6 nearest to the airtight chamber 1 to an area H3b which is nearer to the outside space 100 than the area H3a and is not in contact with a pole piece 6 adjacent to the above nearest pole piece 6, an area 3X nearer to the airtight chamber 1 than the boundary HO is formed of the magnetic material, and an area 3Y nearer to the outside space 100 than the boundary site is formed of the non-magnetic material.

A magnetic circuit in which magnetic field lines occurring from the magnets 5 are led from the area of the magnetic material of the rotating shaft 2 to the area of the magnetic material of the housing 3 and return back to the magnets 5 is formed by configuring the rotating shaft 2 and the housing 3 as described above, whereby spread of the magnetic field in the direction to the airtight chamber 1 can be suppressed.

Here, the magnetic material portions of the rotating shaft 2 and the housing 3 may be formed of, for example, iron and steel material, and the non-magnetic material portions may be formed of non-magnetic metal material, synthetic resin or the like. It is preferable that the joint portion between the magnetic material portion and the non-magnetic material portion is established by a joint method based on diffusion bonding based on friction pressure welding because a firm and smooth surface can be obtained. However, the present invention is not limited to this method, and both the portions may be joined to each other by welding, screw connection or any other method.

Experimental Example 1

Next, an experimental example 1 of the magnetic fluid sealing apparatus according to the present invention will be described with reference to FIGS. 3 and 4.

By using a magnetic fluid sealing apparatus in which two magnets 5 were incorporated in a housing 3 while the confronting end faces in the axial direction of magnets 5 were set to the same pole as shown in FIG. 3, the inventor measured the intensity of magnetic field at a point A distanced from the end face on the airtight chamber side of a rotating shaft 2 along the center axis by 10 mm and the intensity of magnetic field at a point B which was likewise distanced by 50 mm while properly changing the following conditions (1) and (2).

(1) The following areas of S1 to S3 in the rotating shaft 2 are set to either the magnetic material or the non-magnetic material.

S1: an area exposed to the airtight chamber 1 side more than the housing 3.

S2: an area which intrudes from the end face on the side of the airtight chamber 1 of the housing 3 into the hollow portion 3a by the distance corresponding to the thickness of the flange portion 3b.

S3: an area which is located in the hollow portion 3a of the housing 3 and is nearer to the outside space 100 than the flange portion 3b and nearer to the airtight chamber 1 than the pole piece 6 nearest to the airtight chamber 1.

(2) The following areas H1 to H4 in the housing 3 are set to either the magnetic material or the non-magnetic material.

H1: an area where the flange portion 3b is formed

H2: an area which is nearer to the outside space 100 than the flange portion 3b and nearer to the airtight chamber 1 than the pole piece 6 nearest to the airtight chamber 1

H3: an area which is in contact with the pole piece 6 nearest to the airtight chamber 1 (H3a in FIG. 2)

H4: an area ranging from the end of the area H3 to a center portion of an area which is in contact with the pole piece 6 adjacent to the pole piece 6 nearest to the airtight chamber 1.

A measurement result was obtained by measuring the intensities of magnetic field at the point A and the point B while properly changing the combination of the magnetic material area and the non-magnetic material area of the rotating shaft 2 and the magnetic material area and the non-magnetic material area of the housing 3. As shown in FIG. 4, the intensities of magnetic field at the point A and the point B were remarkably reduced in the construction that the areas of the H1, H2 and H3 (H1+H2+H3) of the housing 3 were formed of the magnetic material and the other area of the housing 3 was formed of the non-magnetic area while the areas of S1 and S2 (S1+S2) of the rotating shaft 2 were formed of the non-magnetic material and the other area of the rotating shaft 2 was formed of the magnetic material (data No. 7).

That is, the housing 3 cannot obtain a sufficient magnetically shielding effect by forming only the flange portion 3b of the magnetic material. The shielding effect can be exercised by forming not only the flange portion 3b, but also the area brought into contact with the pole piece 6 nearest to the airtight chamber 1 of the magnetic material because the magnetic circuit is closed. On the other hand, when the magnetic material site straddles the magnet 5, the magnetic field of the magnetic fluid 7 is reduced (reduced by 30 percentages), and thus it is not preferable that the pole piece 6 nearest to the airtight chamber 1 and the pole piece 6 adjacent to the nearest pole piece 6 are connected to each other by the magnetic material portion of the housing 3.

When the magnetic material portion of the rotating shaft 2 protrudes from the hollow portion 3a of the housing 3 to the airtight chamber 1 side, the tip portion of magnetic leakage protrudes to the outside of the shield, so that the leakage intensifies. There is not much difference in the magnetic leakage even when the boundary position between the magnetic material and the non-magnetic material is changed in the hollow portion 3a of the housing 3, but the magnetic leakage is minimized when the boundary is disposed to be nearer to the airtight chamber 1 than the magnetic fluid 7.

Comparative Example 1

Next, a comparative example 1 of the magnetic fluid sealing apparatus according to the present invention will be described with reference to FIGS. 5 and 6.

Figure 5:
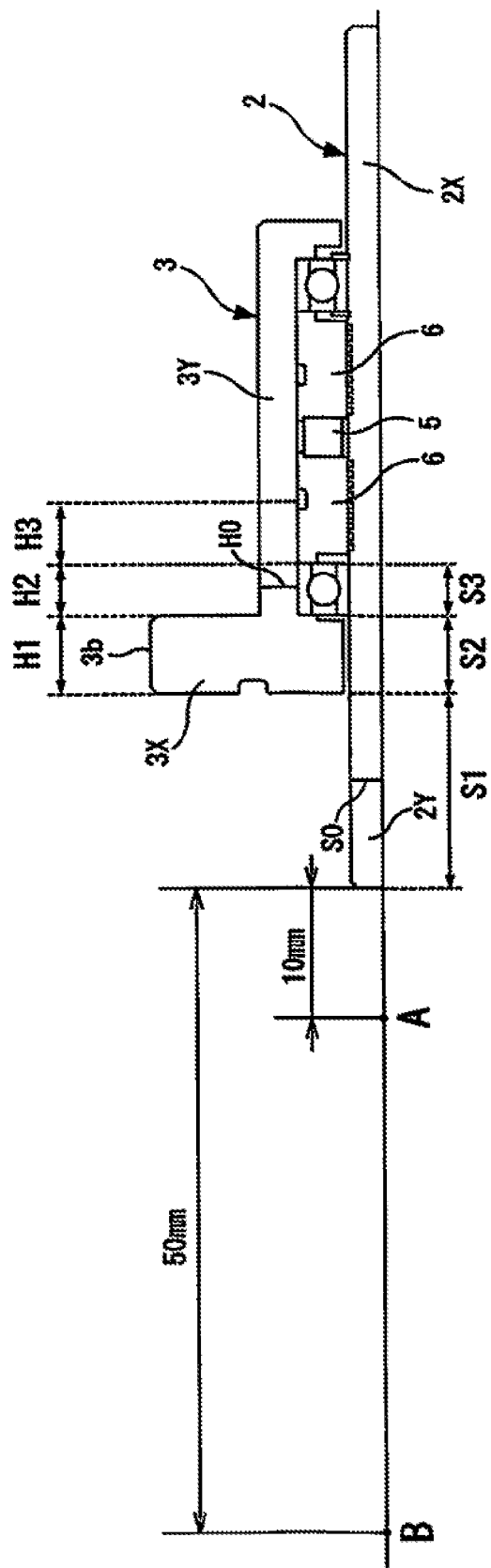
FIG. 5 is a half cross-sectional view showing a comparative example 1 of the magnetic fluid sealing apparatus according to the present invention.

By using a magnetic fluid sealing apparatus in which one magnet 5 was incorporated in a housing 3 as shown in FIG. 5, the inventor measured the intensity of magnetic field at a point A distanced from the end face on the vacuum chamber side of a rotating shaft 2 along the center axis by 10 mm and the intensity of magnetic field at a point B which was likewise distanced by 50 mm while properly changing the foregoing conditions (1) and (2).

As shown in FIG. 6, measurement results for all samples were not preferable, and magnetic leakage was observed in a broad range extending from the point A to the point B.

Experimental Example 2

Next, an experimental example 2 of the magnetic fluid sealing apparatus according to the present invention will be described with reference to FIG. 7.

Figure 7:
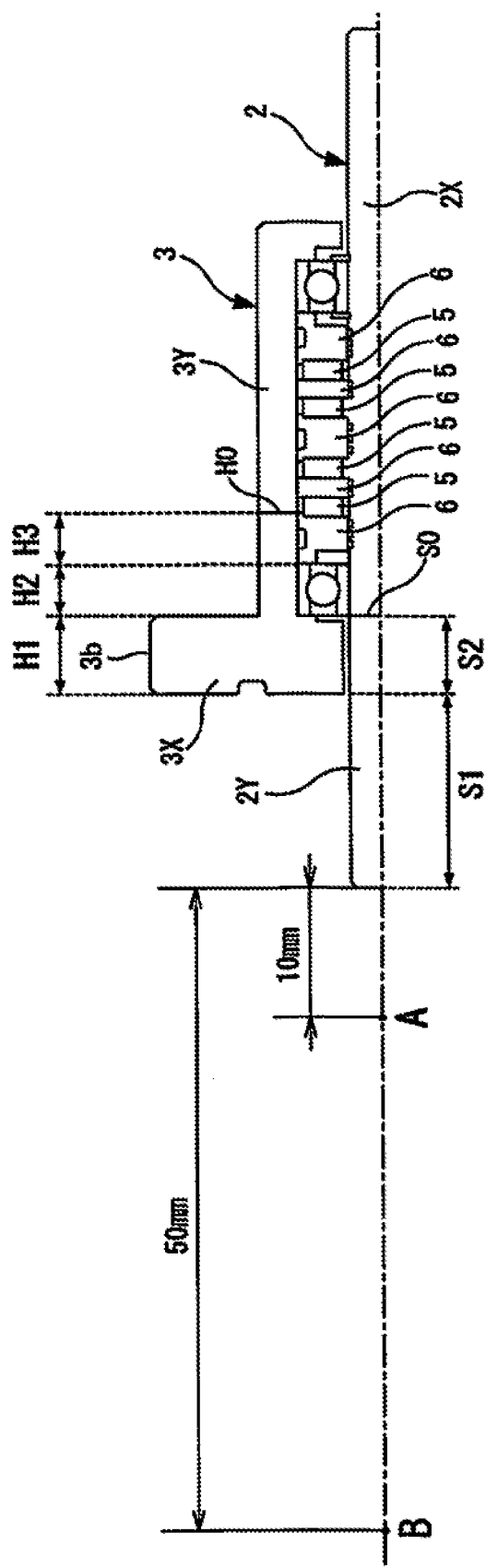
FIG. 7 is a half cross-sectional view showing an experimental example 2 of the magnetic fluid sealing apparatus according to the present invention.

By using a magnetic fluid sealing apparatus in which four magnets 5 were incorporated in a housing 3 and the confronting end faces in the axial direction of the magnets 5 were set to the same pole as shown in FIG. 7, the inventor measured the intensity of magnetic field at a point A distanced from the end face on the airtight chamber side of a rotating shaft 2 along the center axis by 10 mm and the intensity of magnetic field at a point B which was likewise distanced by 50 mm.

The rotating shaft 2 was configured so that the area of S1+S2 was formed of the non-magnetic material and the other area was formed of the magnetic material.

The housing 3 was configured so that the area of H1+H2+H3 was formed of the magnetic material, and the other area was formed of the non-magnetic material.

The measurement result was that the intensity of magnetic field at the point A was equal to 68.7 µT, and the intensity of magnetic field at the point B was equal to 5.7 µT, which were remarkably low intensities of magnetic field.

Comparative Example 2

Next, a comparative example 2 of the magnetic fluid sealing apparatus according to the present invention will be described with reference to FIG. 8.

Figure 8:
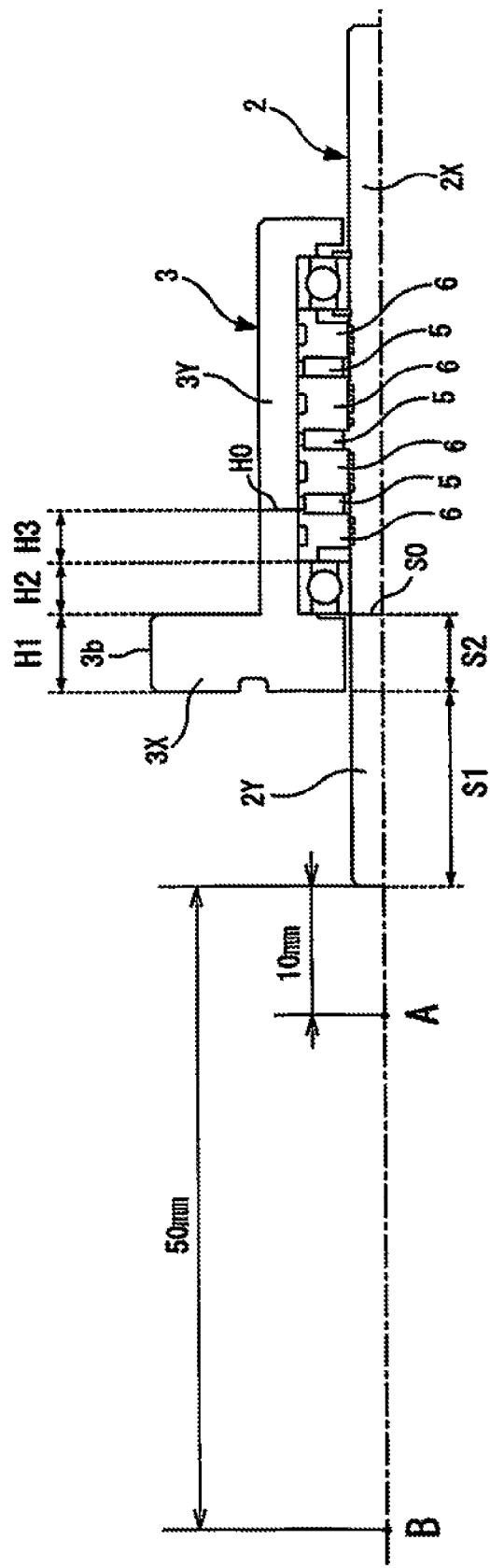
FIG. 8 is a half cross-sectional view showing a comparative example 2 of the magnetic fluid sealing apparatus according to the present invention.

By using a magnetic fluid sealing apparatus in which three magnets 5 were incorporated in a housing 3 and the confronting end faces in the axial direction of the magnets 5 were set to the same pole as shown in FIG. 8, the inventor measured the intensity of magnetic field at a point A distanced from the end face on the airtight chamber side of a rotating shaft 2 along the center axis by 10 mm and the intensity of magnetic field at a point B which was likewise distanced by 50 mm.

The rotating shaft 2 was configured so that the area of S1+S2 was formed of the non-magnetic material and the other area was formed of the magnetic material.

The housing 3 was configured so that the area of H1+H2+H3 was formed of the magnetic material, and the other area was formed of the non-magnetic material.

The measurement result was that the intensity of magnetic field at the point A was equal to 452.4 µT, and the intensity of magnetic field at the point B was equal to 73.4 µT, which were remarkably large intensities of magnetic field.

The present invention is not limited to the above embodiment, and it is needless to say that various design changes may be properly made to the detailed structure of the magnetic fluid sealing apparatus, etc. as occasion demands.

The invention claimed is:

1. A magnetic fluid sealing apparatus for supporting a rotating shaft having a partial area inserted in an airtight chamber while keeping airtightness in the airtight chamber, comprising:
   a housing that is provided at a boundary portion through which the airtight chamber and an outside space thereof are partitioned, and has a hollow portion through which the rotating shaft is inserted;
   a plurality of magnets that are incorporated in the housing and arranged at intervals in an axial direction;
   a plurality of pole pieces that are incorporated in the housing so as to sandwich the plurality of magnets and arranged so that inner end faces thereof in a radial direction confront a peripheral surface of the rotating shaft; and
   magnetic fluid filled between the inner end faces in the radial direction of the pole pieces and the periphery surface of the rotating shaft,
   wherein the plurality of magnets contain an even number of magnets incorporated in the housing, the even number of magnets having end faces that confront each other in the axial direction and are set to the same pole,
   the pole pieces are formed of magnetic material,
   the rotating shaft is provided with a boundary which is located in a hollow portion of the housing and nearer to the airtight chamber than a pole piece nearest to the airtight chamber, an area of the rotating shaft that is nearer to an outside space than the boundary being formed of a magnetic material while an area of the rotating shaft that is nearer to the airtight chamber than the boundary is formed of a non-magnetic material, and
   the housing is provided with a boundary that is provided in a region ranging from an area which is in contact with the pole piece nearest to the airtight chamber to an area which is nearer to the outside space than the former area and is not in contact with a pole piece adjacent to the nearest pole piece, an area of the housing that is nearer to the airtight chamber than the boundary being formed of the magnetic material while an area of the housing that is nearer to the outside space than the boundary is formed of the non-magnetic material.

2. The magnetic fluid sealing apparatus according to claim 1, wherein the magnets contain two or four magnets incorporated in the housing.

3. The magnetic fluid sealing apparatus according to claim 1, wherein
   an entire area of the rotating shaft that is nearer to an outside space than the boundary of the rotating shaft is formed of a magnetic material while an entire area of the rotating shaft that is nearer to the airtight chamber than the boundary of the rotating shaft is formed of a non-magnetic material.

4. The magnetic fluid sealing apparatus according to claim 1, wherein
   an entire area of the housing that is nearer to the airtight chamber than the boundary of the housing is formed of the magnetic material while an entire area of the housing that is nearer to the outside space than the boundary of the housing is formed of the non-magnetic material.

5. The magnetic fluid sealing apparatus according to claim 1, wherein
   an entire area of the rotating shaft that is nearer to an outside space than the boundary of the rotating shaft is formed of a magnetic material while an entire area of the rotating shaft that is nearer to the airtight chamber than the boundary of the rotating shaft is formed of a non-magnetic material; and
   an entire area of the housing that is nearer to the airtight chamber than the boundary of the housing is formed of the magnetic material while an entire area of the housing that is nearer to the outside space than the boundary of the housing is formed of the non-magnetic material.

6. The magnetic fluid sealing apparatus according to claim 1, wherein
   the boundary of the rotating shaft extends radially across the entire width of said rotating shaft, and is a boundary between the area formed of a magnetic material and the area formed of a non-magnetic material.

7. The magnetic fluid sealing apparatus according to claim 1, wherein
   the boundary of the housing extends radially across the entire width of said housing, and is a boundary between the area formed of a magnetic material and the area formed of a non-magnetic material.

\* \* \* \* \*